(12) United States Patent
Cabanas Corrales et al.

(10) Patent No.: US 10,994,327 B2
(45) Date of Patent: May 4, 2021

(54) METHOD OF A HEAT TRANSFER OF A NON-METALLIC OR METALLIC ITEM

(71) Applicant: ArcelorMittal, Luxembourg (LU)

(72) Inventors: Maria Cabanas Corrales, Oviedo Asturias (ES); David Noriega Perez, Oviedo Asturias (ES)

(73) Assignee: ArcelorMittal, Luxembourg (LU)

(*) Notice: Subject to any disclaimer, the term of this patent is extended or adjusted under 35 U.S.C. 154(b) by 390 days.

(21) Appl. No.: 16/064,897

(22) PCT Filed: Dec. 20, 2016

(86) PCT No.: PCT/IB2016/001784
§ 371 (c)(1),
(2) Date: Jun. 21, 2018

(87) PCT Pub. No.: WO2017/109560
PCT Pub. Date: Jun. 29, 2017

(65) Prior Publication Data
US 2020/0282454 A1 Sep. 10, 2020

(30) Foreign Application Priority Data

Dec. 22, 2015 (WO) .................. PCT/IB2015/002394

(51) Int. Cl.
*B22D 11/124* (2006.01)
*C09K 5/10* (2006.01)
(Continued)

(52) U.S. Cl.
CPC ............ *B22D 11/1245* (2013.01); *C09K 5/10* (2013.01); *C21D 1/56* (2013.01); *C21D 1/667* (2013.01); *B82Y 30/00* (2013.01); *C01B 32/182* (2017.08)

(58) Field of Classification Search
CPC ...... B22D 11/1245; C21D 1/56; C21D 1/667; C09K 5/10; C01B 32/182; B82Y 30/00
See application file for complete search history.

(56) References Cited

U.S. PATENT DOCUMENTS 8,834,739 B1 9/2014 Cumberland et al.
9,187,684 B2 11/2015 McCants et al.
(Continued)

FOREIGN PATENT DOCUMENTS

CN  102753664  10/2012
EP  0126481 A2  11/1984
(Continued)

OTHER PUBLICATIONS

Gopalan Ramesh et al, "Review of thermo-physical properties, wetting and heat transfer characteristics of nanofluids and their applicability in industrial quench heat treatment", Nanoscale Research Letters, (Jan. 1, 2011), vol. 6, No. 1, p. 334.
(Continued)

*Primary Examiner* — John A Hevey
(74) *Attorney, Agent, or Firm* — Davidson, Davidson & Kappel, LLC

(57) ABSTRACT

A method of heat treatment of a non-metallic or metallic item is provided. The method includes at least one step of heat transfer between the item and a heat transfer fluid A'. The heat transfer fluid A' includes a fluid medium and nanoparticles having a lateral size between 26 and 50 μm. The heat transfer fluid has a heat transfer coefficient below the heat transfer coefficient of water.

26 Claims, 2 Drawing Sheets

(51) Int. Cl.
  *C21D 1/56* (2006.01)
  *C21D 1/667* (2006.01)
  *C01B 32/182* (2017.01)
  *B82Y 30/00* (2011.01)

(56) References Cited

U.S. PATENT DOCUMENTS

| | | | |
|---|---|---|---|
| 2008/0302998 A1* | 12/2008 | Hong | C09K 5/10 252/74 |
| 2009/0065107 A1 | 3/2009 | Ho et al. | |
| 2009/0121396 A1* | 5/2009 | Serizawa | B21B 45/0218 266/44 |
| 2012/0186789 A1 | 7/2012 | Sedarous et al. | |
| 2013/0256587 A1 | 10/2013 | Zheng et al. | |
| 2013/0341028 A1 | 12/2013 | Christian et al. | |
| 2018/0371304 A1* | 12/2018 | Cabanas Corrales | C21D 1/56 |
| 2019/0002749 A1* | 1/2019 | Noriega Perez | C09K 5/10 |
| 2019/0002750 A1* | 1/2019 | Noriega Perez | C09K 5/10 |

FOREIGN PATENT DOCUMENTS

| | | |
|---|---|---|
| EP | 1961887 A1 | 8/2008 |
| KR | 20110059383 | 6/2011 |
| RU | 2359189 | 6/2009 |
| WO | WO2011084481 | 7/2011 |

OTHER PUBLICATIONS

A Chennakesava Reddy, "Effects of Holding Temperature and Time for Austempering on Impact Toughness of Medium Carbon and High Alloy Steel", (Jan. 1, 2013), URL: http://www.ijcns.com/pdf/201.pdf, INternational Journal of Computer Network and Security (IJCNS) vol. 3, No. 1.

Haitao et al., "Preparation and thermal conductivity of suspensions of graphite nanoparticles" Carbon, Jan. 2007, pp. 226-228, vol. 45, No. 1, Elsevier, Oxford, GB.

Timofeeva et al.: "Percolation theory at work—Boosting the heat transfer performance of graphitic nanofluids," NSTI-Nanotech 2014, www.nsti.org, ISBN 978-1-4822-5826-4 vol. 1, 2014.

* cited by examiner

METHOD OF A HEAT TRANSFER OF A NON-METALLIC OR METALLIC ITEM

The present invention relates to a method of heat transfer of non-metallic or metallic item. In particular, it is well suited for steel, aluminum, stainless steel, copper, iron, copper alloys, titanium, cobalt, metal composite, nickel Industries or non-metallic industries such as plastics.

BACKGROUND

With a view of saving energy consumption, it is possible to improve the performance of heat exchangers systems and to introduce various heat transfer enhancement techniques. Most of techniques have focused on the improvement of heat transfer performance, i.e. the improvement of heat transfer coefficient. Usually, air pressure or fluids such as water, engine oil, ethylene glycol, etc. are used as heat transfer fluid sometimes with additives to improve heat transfer performance.

Additionally, recent investigations in nanotechnology have allowed the development of a new category of heat transfer fluid comprising nanoparticles. Such fluids also called "Nanofluids" are liquid suspension containing particles having at least one dimension below 100 nm. These heat transfer fluids have usually an increased heat transfer coefficient.

Such fluids can be used for accelerating the heat transfer, for example the cooling, between a non-metallic or metallic and a heat transfer fluid. For example, in steel making industry, during the cooling process in a hot rolling process, the run-out table cools the steel strip from approximately 800-950° C. at the entrance to 450-600° C. at the exit. Thus, for some steel grades, a heat transfer fluid having high heat transfer coefficient is needed.

However, it is sometimes necessary to slow down the heat transfer between a non-metallic or metallic item and a heat transfer fluid. For example, during the manufacture of the medium- to high-carbon steels rods, the cooling is a step really important. Indeed, the cooling has to be really slow and controlled in order to obtain a rod having a fine pearlitic microstructure and of uniform quality. If the cooling is too rapid, the risk is to obtain martensitic structure which is detrimental for the manufacture of steel rods having improved strength and drawability.

The patent application EP0126481 discloses a method of direct heat treatment of a medium- to high-carbon steel rod by performing controlled cooling on an expanded spiral coil of a hot rolled medium to high-carbon steel rod that has an austenitic structure. The cooling is performed by passage of the coil through a vessel containing a coolant composed of a gas bubble-water mixed fluid under a strong turbulent action which contains a uniform dispersion of oxidizing gas bubbles and which is held a predetermined temperature not higher than 95° C.

However, there is a risk not to have fine gas bubbles having a uniform size distribution. Indeed, the volume of bubble gas in a vessel is difficult to control. When the gas is blown into the warm water, the resulting bubbles are warmed up and the warm water evaporates into the bubbles until the equilibrium state is reached, and as a result, there occurs an almost instantaneous swelling of the bubbles. Additionally, a specific superficial velocity has to be respected to avoid the coalescence of gas bubbles together to form a single gaseous phase. Finally, a large volume of gas is needed in order to prepare the gas bubble-water mixed fluid containing oxidizing gas bubbles. Consequently, in industrial scale, the use of such fluid containing gas is difficult to handle and it is high costs effective.

SUMMARY OF THE INVENTION

A purpose of the present invention is to provide an easy to implement method of heat treatment of a non-metallic or metallic item comprising at least one heat transfer between the item and a heat transfer fluid having a heat transfer coefficient below the heat transfer coefficient of water. In particular, there is a need to provide a method wherein the heat transfer can be slow and controlled.

The present invention provides a method of heat treatment of a non-metallic or metallic item comprising at least one step A) of heat transfer between said item and a heat transfer fluid A' comprising a fluid medium and nanoparticles having a lateral size of the nanoparticles is between 26 and 50 μm, the heat transfer fluid having a heat transfer coefficient below the heat transfer coefficient of water.

The following terms are defined:
heat transfer fluid comprising nanoparticles (so-called Nanofluid) means a liquid suspension containing particles having at least one dimension below 100 nm,
laminar flow means a flow with a Reynolds number below a critical value of approximately 2300,
turbulent flow means a flow with a Reynolds number larger than a critical value of about 4000,
percolation threshold concentration is the concentration of nanoparticles above which they are connected forming a long-range network. For heat transfer applications, it is suitable that such network connects the hottest part, i.e. the part where the heat starts to flow, of the fluid and the coldest part of the fluid, i.e. the one where the heat is evacuated. In other words, below the Percolation threshold concentration, nanoparticles are not connected. When the Percolation threshold concentration is obtained, the network formed with nanoparticles, having higher thermal conductivity than the fluid medium, allows the heat carriers to take a path with much less thermal resistance, thus enhancing the thermal conductivity of the fluid, and therefore the heat transfer coefficient
wt. % means percentage by weight,
graphite nanoplatelets means a multilayered system of graphene sheets having a thickness around between 5 and 20 nm,
few layers graphene means a multilayered system of graphene sheets having a thickness between 1 and 5 nm and
graphene means a single-atom-thick sheet of hexagonally arranged, bonded carbon atoms, presenting usually a thickness below 1 nm.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

The invention relates to a method of heat treatment of non-metallic or metallic item comprising at least one step A) of heat transfer between the item and a heat transfer fluid A' comprising a fluid medium and nanoparticles having a lateral size of the nanoparticles is between 26 and 50 µm, the heat transfer fluid having a heat transfer coefficient below the heat transfer coefficient of water.

Preferably, the method further comprises at least one step B) of heat transfer between the item and a heat transfer fluid B' comprising a fluid medium and nanoparticles, the heat transfer fluid B' having a heat transfer coefficient different from the heat transfer coefficient of A' and below the heat transfer coefficient of water.

More preferably, the method also comprises at least one step C) of heat transfer between the item and a heat transfer fluid C' comprising a fluid medium and nanoparticles, the heat transfer fluid C' having a heat transfer coefficient above the heat transfer coefficient of water.

Advantageously, the method also comprises at least one step D) of heat transfer between the item and a heat transfer fluid D' comprising a fluid medium and nanoparticles, the heat transfer fluid D' having a heat transfer coefficient different from the heat transfer coefficient of C' and above the heat transfer coefficient of water.

According to the invention, the steps A), B), C), D) can be performed in any order, steps B, C and D being optional. In a preferred embodiment, the method of heat treatment according to the invention comprises steps A) and B) performed successively. In another preferred embodiment, step B) is performed before step A). Advantageously, the method of heat treatment according to the invention comprises steps A), B) and C) performed successively. They can also be performed in the following orders: B), C) and A) or C), A) and B). Preferably, the method of heat treatment according to the invention comprises steps A), B), C) and D) performed successively. They can also be performed in the following orders: B), C), A) and D) or A), C), D) and B).

In a preferred embodiment, the heat transfer fluid comprises nanoparticles chosen from graphite nanoplatelets, graphene, few layers graphene, $TiO_2$, $ZnO_2$, ZnO, Boron-nitride, copper, silica, montmorillonite, zeolite clipnoptilo-lite, wollastonite, mica, zeolite 4A, $Al_2O_3$, silicate, pumice, calcium oxide or carbon nanotubes. Preferably, the nanoparticles do not comprise carbon nanotubes.

For example, the nanoparticle can be spherical, elliptical or nanoplatelets.

Figure 1:
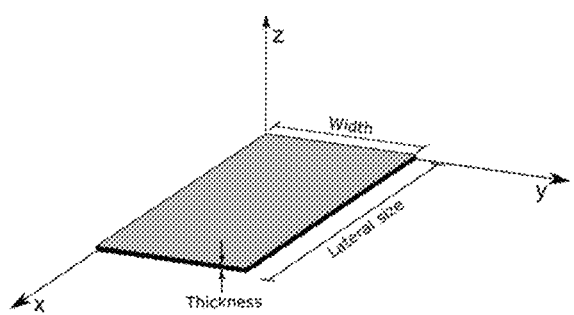
FIG. 1 illustrates an example of one nanoplatelet according to the present invention.

FIG. 1 illustrates an example of one nanoplatelet that can be used in the heat transfer fluid of the present invention. In this example, the lateral size means the highest length of the nanoplatelet through the X axis and the thickness means the height of the nanoplatelet through the Z axis. The width of the nanoplatelet is illustrated through the Y axis.

Figure 2:
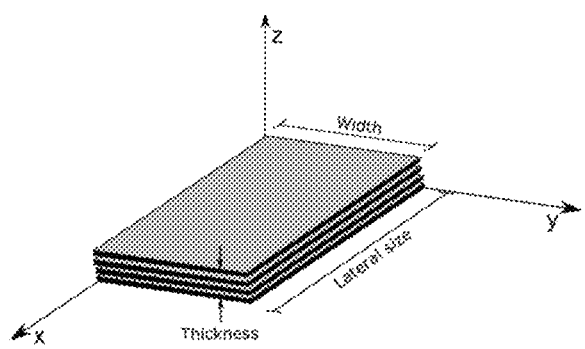
FIG. 2 illustrates an example of multilayered nanoplatelets according to the present invention.

FIG. 2 illustrates an example of multilayered nanoplatelets that can be used in the heat transfer fluid of the present invention. In this example, the lateral size means the highest length of the nanoplatelets through the X axis and the thickness means the total height of all the stacked nanoplatelets through the Z axis. The width of the nanoplatelet is illustrated through the Y axis.

Figure 3:
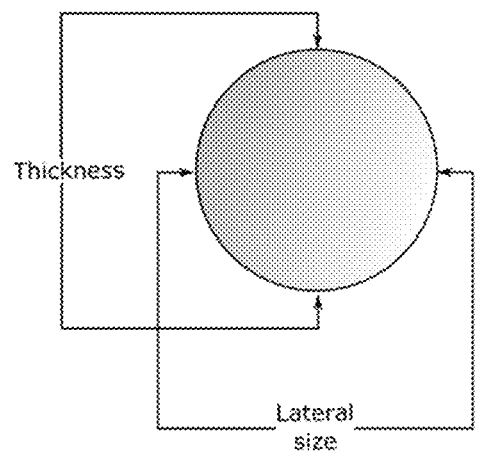
FIG. 3 illustrates an example of spherical nanoparticle according to the present invention.

FIG. 3 illustrates an example of spherical nanoparticle that can be used in the heat transfer fluid of the present invention. In this example, the lateral size means the diameter of the nanoparticle and the thickness means the height of the nanoparticle.

Figure 4:
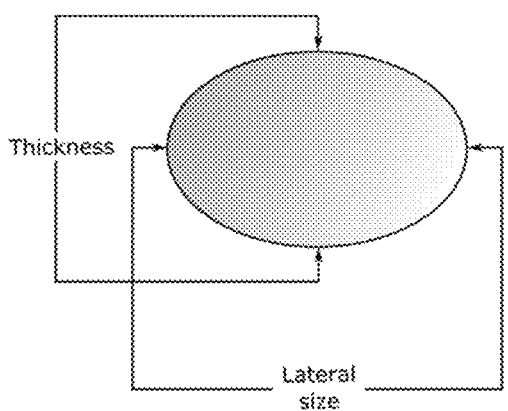
FIG. 4 illustrates an example of elliptical nanoparticle according to the present invention.

FIG. 4 illustrates an example of elliptical nanoparticle that can be used in the heat transfer fluid of the present invention. In this example, the lateral size means highest length of the nanoparticle and the thickness means the height of the nanoparticle.

The lateral size and the thickness of the nanoparticle can be measured by Scanning Electron Microscopy (SEM), Transmission Electron Microscopy (TEM) and Atomic Forces Microscopy (AFM).

Preferably, the nanoparticles are multilayered nanoplatelets. Indeed, without willing to be bound by any theory, it seems that to obtain nanoplatelets morphology, nanoparticles should have a multilayer structure with weak interaction between layers, i.e. Van der Waals, hydrogen bond, mechanical bond, halogen bond, pi stacking, cation/anion-pi bonds, intercalation, salt bridges and polar-pi. This weak bonding together with a good thermal conductivity of the nanoplatelets raises the possibility of improving heat transfer coefficient of a fluid.

Advantageously, the thickness of nanoparticles is between 1 and 99.99 nm, preferably between 5 to 50 nm and more preferably between 5 to 15 nm.

Preferably, the lateral size of the nanoparticle of at least one heat transfer fluid chosen from: B', C' and D' is between 26 and 50 µm.

Advantageously, the lateral size of the nanoparticle of at least one heat transfer fluid chosen from: A', B', C' and D' is between 35 and 45 µm.

Preferably, the nanoparticle concentration is between 0.01 wt. % and 12 wt. %, advantageously between 2 and 8 wt. % and more preferably between 4 and 7 wt. %.

In a preferred embodiment, the heat transfer fluid has a dispersing agent being a non-surface active polymer, a surfactant or a mixture thereof. The surfactant can be cationic, anionic, amphoteric or non-ionic.

For example, the dispersant agent can be polyvinnylpyr-rolidone, polysaccharides, sulphated polysaccharides, linear alkylbenzene sulfonates, lignin sulfonates, di-alkyl sulfos-uccinates, quaternary ammonium compounds, sodium stearate or a mixture thereof.

Preferably, the nanoparticles concentration/dispersing agent concentration ratio in weight is between 3 and 18. More preferably, the nanoparticles concentration/dispersing agent concentration ratio is between 4 and 15, advantageously between 4 and 8 and preferably being between 4 and 6.

Without willing to be bound by any theory, it seems that when the above ratio is controlled and the Percolation threshold concentration reached, the heat transfer fluid according to the invention allows for a higher thermal conductivity and therefore a higher heat transfer coefficient in laminar regime flow. Indeed, the dispersing agent would be able to avoid deposition and agglomeration of nanoparticles. For instance, if the dispersing agent is a surfactant, the nanoparticle would be enclosed by a micelle consisting in a core of hydrophobic molecules and a shell of hydrophilic molecules. Such micelle structure allows dispersing nanoparticles within the fluid. However to obtain percolation, in other words the formation of the long-range network formed by the nanoparticles, the degree of dispersion of nanoparticles has to be limited.

Preferably, the heat transfer fluid comprises a fluid medium chosen from water, ethylene glycol, ethanol, oil, methanol, silicone, propylene glycol, alkylated aromatics, liquid Ga, liquid In, liquid Sn, potassium formate or a mixture thereof. Gallium, Indium and Tin can be used as heat transfer fluid, in particular for the cooling of a metallic item. Indeed, the melting point of gallium is of 30° C., the one of indium is 157° C. and the one of tin is of 232° C. For example, they can be used to cool down computer chips or laboratory equipments such as neutron sources.

The heat transfer fluid is preferably manufactured by the following steps:
  A. the provision of nanoparticles according to the present invention,
  B. the provision of a fluid medium,
  C. the adjustment of the nanoparticle concentration in order to achieve percolation and
  D. the mixing of the nanoparticles with the fluid medium.

According to the invention, the flow of the heat transfer fluid can be in a laminar or turbulent flow regime. In a laminar flow regime, the heat transfer coefficient is proportional to the thermal conductivity. On the contrary, in turbulent flow regime, the heat transfer coefficient depends on a set of thermo-physical properties such as viscosity.

According to the invention, the heat transfer step is between a metallic or non-metallic item and the heat transfer fluid. Preferably, the metallic item, being for example a metallic substrate, is made of aluminum, steel, stainless steel, copper, iron, copper alloys, titanium, cobalt, metal composite, nickel and the non-metallic is made of plastics.

In the prior art, the heat transferring using water as fluid medium can usually be realized by one mode. The mode is called "contact water" which means that water is used to cool or heat an object by being in direct contact with it.

According to a preferred embodiment of the invention, the item, being metallic, is a metallic substrate and the heat transfer fluid is directly in contact with it. In this case, the heat transfer can be realized by jet impingement cooling, pool boiling, spray cooling or micro-channel cooling.

For example, in the steel making industry, the heat transfer by contact water cooling can be implemented:
  in sprays chambers of continuous casters and hot rolling process such as the cooling process on the run-out table,
  In coke ovens for gas treatment and quenching of coke,
  during the slag quenching in blast furnaces, basic oxygen furnaces and electric arc furnaces.

Preferably, the method of the heat treatment according to the invention further comprises at least one heating step. For example, the heating step is performed at a temperature between 0 to 1200° C.

The method according to the present invention can be performed for example in the construction industry, in particular in the method for manufacturing the steel beams. For example, structural beams according to EP1961887 are produced by cutting a specific sinusoidal line in a starting H-section, being a steel plate in a form of H, by flame cutting. Then, two obtained T-sections are shifted and welded by arc welding. Usually, after the arc welding, it is known to cool down. This cooling step is important since it define the final microstructure of the welded and therefore, the final mechanical properties.

Generally, water is used as heat transfer fluid to cool down the welded beam. However, the cooling with water is too fast so there is a risk that the welding point has a brittle microstructure. It is also possible to cool down the beam with air. However, such cooling will take too much time. Thus, in this case, it is necessary to have a heat transfer fluid having a heat transfer coefficient lower than the one of water but higher than the one of air in order to obtain the good cooling rate and consequently, to reach the desired welding point microstructure.

With the method according to the present invention, it is possible to have such heat transfer fluid. Indeed, the heat treatment, being the cooling of the welded beam, can be performed with a heat transfer fluid A') comprising water as a fluid medium and Graphite nanoplatelets having a lateral size of 40 μm and a thickness of 10 nm. The concentration of the nanoparticles is of 7 wt. %. The fluid A' further comprises 1 wt. % of polyvinylpyrolidone as dispersing agent. The nanoparticles concentration/dispersing agent concentration ratio is 7. The heat transfer reduction with respect to the one of water is of −53% in turbulent regime flow at 25° C. Thus, this fluid A') allows for a slower cooling than water and higher than air.

When two slow cooling steps have to be performed with two heat transfer fluids having different heat transfer coefficient, both being below the one of water, the above fluid A') and another heat transfer fluid B') can be used. For example, the heat transfer fluid B') comprises water as fluid medium and graphite nanoplatelets having a lateral size of 40 μm and a thickness of 10 nm. The concentration of nanoparticles is of 10 wt. %. The fluid B' further comprises 1 wt. % of polyvinylpyrrolidone as dispersing agent. The nanoparticles concentration/dispersing agent concentration ratio is 10. The heat transfer reduction with respect to the one of water is of −75% in turbulent regime flow at 25° C.

The method according to the present invention can also be performed for example in any method for manufacturing a metallic substrate, in particular iron alloys. Indeed, after the annealing of such metallic substrate, a cooling is usually performed in order to obtain the desired microstructure. The cooling step can be achieved with the method according to the present invention using a heat transfer fluid having a heat transfer coefficient below the one of water. This results in a controlled cooling rate that allows microstructural design as a function of the desired mechanical properties and final applications.

Example

Trials 1 to 2 were prepared by mixing nanographite multilayers having graphite nanoplatelets having a lateral size of 40 μm and a thickness of 10 nm and 1 wt. % of polyvinnylpyrrolidone as dispersing agent was added.

Trial 3 consisted of water.

For each trial, the thermal conductivity of the samples has been measured employing a DTC-25 thermal conductivity meter. The thermal conductivity enhancement was calculated with respect to the conductivity of water, the conductivity of water being of 0.67 W/mK at room temperature, i.e. 20° C.

In turbulent flow, the heat transfer enhancement was calculated thanks to the following formula:

$$\frac{h_{nf}}{h_{bf}} = \left(\frac{k_{nf}}{k_{bf}}\right)^{3/5} \left(\frac{\rho_{nf}}{\rho_{bf}}\right)^{4/5} \left(\frac{C_{p,nf}}{C_{p,bf}}\right)^{2/5} \left(\frac{\mu_{nf}}{\mu_{bf}}\right)^{-2/5}$$

With $h_{nf}$: Heat transfer coefficient of nanofluids (J/s·K·m²), $h_{bf}$: Heat transfer coefficient of base fluid (J/s·K·m²), $k_{nf}$: Thermal conductivity of the nanofluids (J/s·K·m), $\rho_{nf}$: Density of the nanofluids (kg/m³), $C_{p,nf}$: Heat capacity of the nanofluids (J/kg·K) and $\mu_{nf}$: Viscosity of the nanofluids (kg/s·m).

The density of the nanofluids was calculated using Helium pycnometry. The heat capacitance at 20° C. was determined using differential scanning calorimetry in nitrogen atmosphere.

| Trials | fluid | Nanoparticles concentration (wt. %) | Dispersing agent (wt. %) | $C_{nanoP}/C_{disp}$ ratio | Heat transfer enhancement (%) |
|---|---|---|---|---|---|
| 1* | Water and graphite nanoplatelets | 7 | 1 | — | −53 |
| 2* | Water and graphite nanoplatelets | 10 | 1 | 10 | −75 |

*according to the present invention.

The cooling performance of Trials 1, 2 and Trial 3, consisting of water, was calculated thanks to a modeling software. In this test, a steel slab having a density of 7854 kg/m³ was cooled during 13 seconds. The length was of 5 meter, the width of 1 meter and the slab thickness was of 10 mm. The initial temperature of the slab was of 968° C.

On the one hand, the cooling of the slab was successively performed with Trials 1 and 2 as follows:
a first cooling step with Trial 1 in laminar flow regime,
a second cooling step with Trial 2 in turbulent regime flow.

On the other hand, Trial 3 was used in laminar flow. The following table shows the cooling rate by using on the one hand, Trials 1 and 2 and the other hand, Trial 3:

| Trials | Cooling rate (° C./s) |
|---|---|
| 1* | 12.8 |
| 2* | 8.8 |
| 3 | 21.4 |

*according to the present invention

Trial 1 and 2 allow for a slow cooling, the cooling using Trial 2 being slower than the cooling with Trial 1. Thus, with the method according to the present invention, it is possible to control the cooling compared to water, i.e. Trial 3.

What is claimed is:

1. A method of heat treatment of a non-metallic or metallic item comprising the step of:
transferring heat between a non-metallic or metallic item and a heat transfer fluid A', in a turbulent regime flow, including a fluid medium and nanoparticles, a lateral size of the nanoparticles being between 26 and 50 μm, the heat transfer fluid having a heat transfer coefficient below a heat transfer coefficient of water and satisfying the following formula:

$$\frac{h_{nf}}{h_{bf}} = \left(\frac{k_{nf}}{k_{bf}}\right)^{3/5} \left(\frac{\rho_{nf}}{\rho_{bf}}\right)^{4/5} \left(\frac{C_{p,nf}}{C_{p,bf}}\right)^{2/5} \left(\frac{\mu_{nf}}{\mu_{bf}}\right)^{-2/5}$$

wherein $h_{nf}$ is heat transfer coefficient of the heat transfer fluid A' (J/s·K·m²), $h_{bf}$ is heat transfer coefficient of water (J/s·K·m²), $k_{nf}$ is thermal conductivity of the heat transfer fluid A' (J/s·K·m) measured at room temperature, $\rho_{nf}$ is density of the heat transfer fluid A' (kg/m³), $C_{p,nf}$ is heat capacity of the heat transfer fluid A' (J/kg·K) and $\mu_{nf}$ is viscosity of the heat transfer fluid A' (kg/s·m), and
the nanoparticles are multilayered nanoplatelets.

2. The method according to claim 1, further comprising the step of:
transferring heat between the item and a heat transfer fluid B' including a fluid medium and nanoparticles, the heat transfer fluid B' having a heat transfer coefficient different from the heat transfer coefficient of A' and below the heat transfer coefficient of water.

3. The method according to claim 1, further comprising the step of:
transferring heat between the item and a heat transfer fluid C' including a fluid medium and nanoparticles, the heat transfer fluid C' having a heat transfer coefficient above the heat transfer coefficient of water.

4. The method according to claim 3, further comprising the step of:
transferring heat between the item and a heat transfer fluid D' including a fluid medium and nanoparticles, the heat transfer fluid D' having a heat transfer coefficient different from the heat transfer coefficient of C' and above the heat transfer coefficient of water.

5. The method according to claim 1, wherein the nanoparticles are selected from a group consisting of: graphite nanoplatelets, graphene, a few layers graphene, $TiO_2$, $ZnO_2$, ZnO, boron-nitride, copper, silica, montmorillonite, zeolite clipnoptilolite, wollastonite, mica, zeolite 4A, $Al_2O_3$, silicate, pumice, calcium oxide or carbon nanotubes or any mixture thereof.

6. The method according to claim 5, wherein the nanoparticles do not include carbon nanotubes.

7. The method according to claim 1, wherein a thickness of the nanoparticles is from 1 to 99.99 nm.

8. The method according to claim 7, wherein the thickness of the nanoparticles is from 5 to 50 nm.

9. The method according to claim 8, wherein the thickness of the nanoparticles is from 5 to 15 nm.

10. The method according to claim 1, wherein a lateral size of the nanoparticles is from 35 to 45 μm.

11. The method according to claim 10, wherein the lateral size is 40 μm.

12. The method according to claim 1, wherein a nanoparticles concentration is from 0.01 to 12 wt. %.

13. The method according to claim 12, wherein the nanoparticles concentration is from 2 to 8 wt. %.

14. The method according to claim 13, wherein the nanoparticles concentration is from 4 to 7 wt. %.

15. The method according to claim 1, wherein the heat transfer fluid A' includes a dispersing agent.

16. The method according to claim 15, wherein the dispersing agent is a non-surface active polymer, a surfactant or a mixture thereof.

17. The method according to claim 16, wherein the surfactant is cationic, anionic, amphoteric or non-ionic.

18. The method according to claim 17, wherein the dispersing agent is selected from a group consisting of: polyvinnylpyrrolidone, polysaccharides, sulphated polysaccharides, linear alkylbenzene sulfonates, lignin sulfonates, di-alkyl sulfosuccinates, quaternary ammonium compounds and sodium stearate or a mixture thereof.

19. The method according to claim 15, wherein a nanoparticles concentration/dispersing agent concentration ratio in weight is from 3 to 18.

20. The method according to claim 1, wherein the fluid medium is selected from a group consisting of: water, ethylene glycol, ethanol, oil, methanol, silicone, propylene glycol, alkylated aromatics, liquid Ga, liquid In, liquid Sn, potassium formate and any mixture thereof.

21. The method according to claim 1, wherein the heat transfer fluid A' is in laminar or turbulent regime flow.

22. The method according to claim 1, wherein the item is metallic and is made of aluminum, steel, stainless steel, copper, iron, copper alloys, titanium, cobalt, metal composite or nickel.

23. The method according to claim 1, wherein the item is a metallic substrate and the heat transfer is such that the heat transfer fluid A' is directly in contact with the metallic substrate.

24. The method according to claim 23, wherein the contact between the metallic substrate and the heat transfer fluid A' is realized though jet impingement cooling, pool boiling, spray cooling or micro-channel cooling.

25. The method according to claim 1, further comprises the step of:
heating the item.

26. The method according to claim 25, wherein the heating is at a temperature between 0 and 1200° C.

* * * * *